D. C. MULVIHILL.
AUTOMOBILE LIFTING DEVICE.
APPLICATION FILED NOV. 9, 1917.

1,279,576.                                    Patented Sept. 24, 1918.

Witness:
Harry S. Gaither

Inventor:
Daniel C. Mulvihill
by Charles O. Sherwey
Atty

UNITED STATES PATENT OFFICE.

DANIEL C. MULVIHILL, OF HANNIBAL, MISSOURI.

AUTOMOBILE-LIFTING DEVICE.

1,279,576. Specification of Letters Patent. Patented Sept. 24, 1918.

Application filed November 9, 1917. Serial No. 201,113.

*To all whom it may concern:*

Be it known that I, DANIEL C. MULVIHILL, a citizen of the United States, and a resident of Hannibal, county of Marion, and State of Missouri, have invented certain new and useful Improvements in Automobile-Lifting Devices, of which the following is declared to be a full, clear, and exact description.

This invention relates to automobile lifting devices, and is in the nature of an improvement upon the invention in automobile lifting devices shown and described in my application for patent filed in the United States Patent Office on August 1, 1917, Serial No. 183,967, upon which Letters Patent issued on the sixth day of November A. D. 1917, under No. 1,245,160. The principal object of the present invention is to provide simplified means whereby the lifting device may be quickly and readily applied to a wheel of an automobile, and without the aid of any tools of any description.

The invention consists in the several novel features hereinafter fully described and particularly pointed out in the claims.

Figure 1:
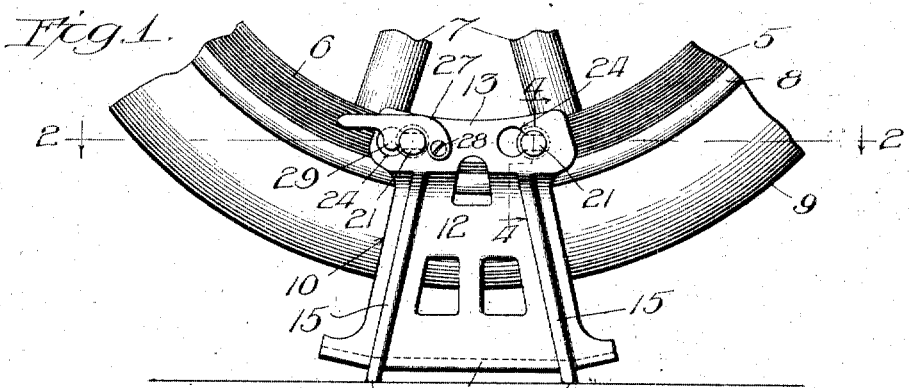
Figure 2:
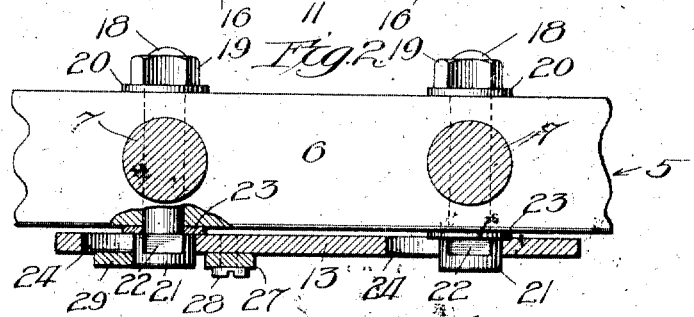
Figure 3:
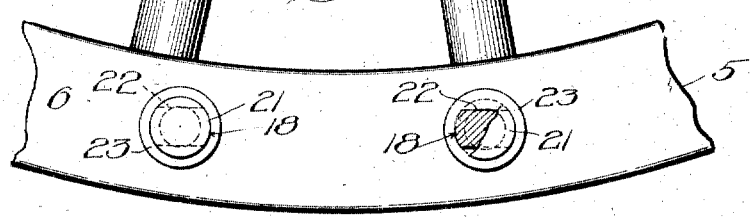
Figure 4:
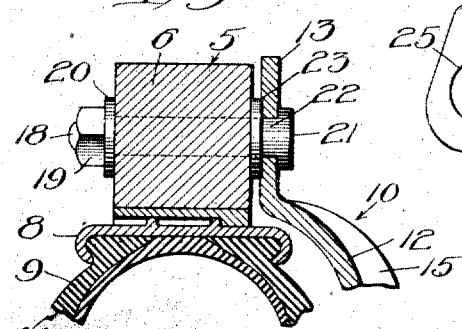
Figure 5:
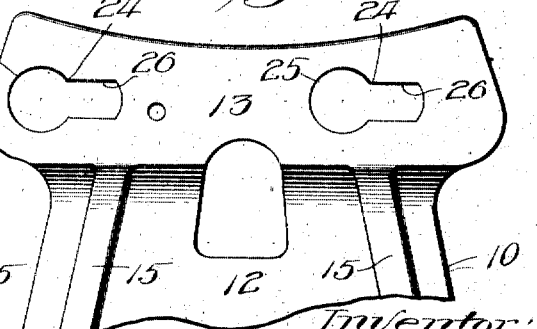

The invention is clearly illustrated in the drawing accompanying this specification, in which Figure 1, is a side elevation of a fragment of an automobile wheel with a simple form of the present invention applied thereto; Fig. 2, is a view partly in plan and partly in horizontal section of the wheel and lifting device, the line of section being indicated at 2—2 of Fig. 1; Fig. 3, is a side elevation of a fragment of a wheel with the lifting device removed; Fig. 4, is a vertical cross section taken on the line 4—4 of Fig. 1, and Fig. 5, is a side elevation of a fragment of the lifting device.

Referring to said drawings, 5 designates a fragment of an ordinary automobile wheel of which 6, designates the felly, 7, the spokes, 8, the rim, and 9, the pneumatic tire. The body 10, of the lifting device, may be constructed in accordance with that shown in my prior application above referred to, and may be formed with a horizontal base portion 11, adapted to extend underneath the tire of the wheel and rest upon the roadway, and an upright portion 12, which extends alongside the tire and terminates at its upper end in an offset flat vertical portion 13. For the sake of lightness, the portion 12, may be formed with openings, and in order to strengthen the lifting device at the proper places, ribs 15, are provided, which extend under the base portion, as of 16.

Securing means are permanently fastened to the felly of the wheel, and are arranged to engage and detachably fasten the lifting device to the wheel. As shown, two bolts 18, extend through the felly 6, of the wheel, and are secured thereon by nuts 19, which bear against washers 20. The heads 21, of the bolts 18, are round, and have flat neck portions 22, which bear against washers 23, that are placed against the inner face of the felly of the wheel. The flat neck portions of the bolts are in alinement with each other to permit of the engagement of the lifting device with them.

The flat vertical portion 13, of the lifting device is formed with two key hole slots 24, 24, the round portions 25, of which are arranged to slip over the heads 21, of the bolts, and the flat portions 26, are arranged to receive the flat neck portion 22, of the bolts. Said key hole slots are positioned to register with the bolts 18, whereby the lifting device may be slipped upon said bolts with the necks in line with the flat portions 26, of the slots, after which the device may be moved toward the left to bring the necks of the bolts into the flat portions of the slots.

For positively securing the lifting device upon the bolts 18, I provide a catch 27, which is pivotally secured to the flat vertical portion 13, by means of a screw or other pivotal connection 28, and said catch has a finger 29, which is arranged to project down along the side of the neck of one of the bolts, as seen in Fig. 1, when swung into locking position, to thereby prevent relative movement between the wheel and lifting device.

When it is desired to use the lifting device, the catch 27, is swung back, and the flat upright portion 13, of the device placed upon the bolts 18, and moved toward the left until the flat necks thereof rest in the flat portions of the key hole slots. The catch 27, is thereupon swung down, bringing the finger 29, at the side of one of the bolt heads. The vehicle is then moved along until the base portion of the lifting device engages the roadway and the continued movement of the vehicle in the same direction will cause the wheel to be lifted up, free of the ground. It is to be observed that the bolt heads of the bolts 18, should be on the inner side of the wheels so that the lifting device is made to engage with the wheels from the inner side, to permit the ready removal of the tires. To remove the lifting device, the vehicle is moved forward or backward sufficiently to free the device from the roadway, after which the catch is raised, and the device detached from the heads of the bolts. The device is particularly useful in changing tires, but by providing four of the devices, the entire vehicle may be lifted free of the floor to take the weight off the tires.

More or less variation of the details of construction is possible without departing from the spirit of this invention. I desire, therefore, not to limit myself to the exact form of construction shown and described, but intend in the following claims to point out all of the invention disclosed herein.

I claim as new, and desire to secure by Letters Patent:

1. A lifting device for automobiles comprising a body portion having a base adapted to rest upon the ground, and a flat portion at its upper end formed with a plurality of key hole slots, and means adapted to be secured on the felly of a wheel, having headed elements adapted to project through said key hole slots.

2. A lifting device for automobiles comprising a body portion having a base at its lower end adapted to rest upon the ground, and a flat vertical portion formed with a plurality of key hole slots, and connecting means adapted to be secured to the felly of a wheel, and having headed portions and flat neck portions, said headed portions being arranged to engage the outer face of the flat vertical portion of the body, and the neck portions being adapted to extend through the flat portions of the key hole slots.

3. A lifting device for automobiles comprising a body portion having a base portion at its lower end adapted to rest upon the ground, and a flat vertical portion at its upper end formed with a plurality of key hole slots, a plurality of bolts adapted to extend through the felly of a wheel, and having non-circular neck portions adapted to extend through said key hole slots, and headed portions beyond the neck portions for engaging the outer face of the flat vertical portion of the body.

4. A lifting device for automobiles comprising a body portion adapted to rest upon the ground and having a flat vertical portion at its upper end formed with a plurality of key hole slots, a plurality of bolts adapted to be secured in the felly of a wheel and having neck portions arranged to extend through said key hole slots, and heads upon their outer ends for engagement with the face of said upper portion of the body, and a catch adapted to engage one of said bolts to prevent relative movement between the body portion and felly of the wheel.

5. A lifting device for automobiles comprising a body portion adapted to rest upon the ground, and having a flat vertical portion at its upper end formed with a plurality of key hole slots, a plurality of bolts adapted to be secured in the felly of a wheel, and having neck portions arranged to extend through said key hole slots and heads upon their outer ends for engagement with the face of said flat vertical portion of the body, and a catch pivotally secured to said vertical portion of the body, and having a finger adapted to overhang one of the heads of said bolts to prevent relative movement between the body portion and felly of the wheel.

6. In a lifting device for automobiles, a body portion adapted to rest upon the ground and formed with a plurality of alined slots in its upper end, and a plurality of alined attaching devices secured to the felly of a wheel, and having headed portions coacting with said slots to detachably secure the body portion of the felly of a wheel.

DANIEL C. MULVIHILL.